Sept. 30, 1924.
W. B. UFFERT ET AL
1,510,356
VEHICLE RUNNING GEAR
Filed Dec. 14, 1921
3 Sheets-Sheet 3
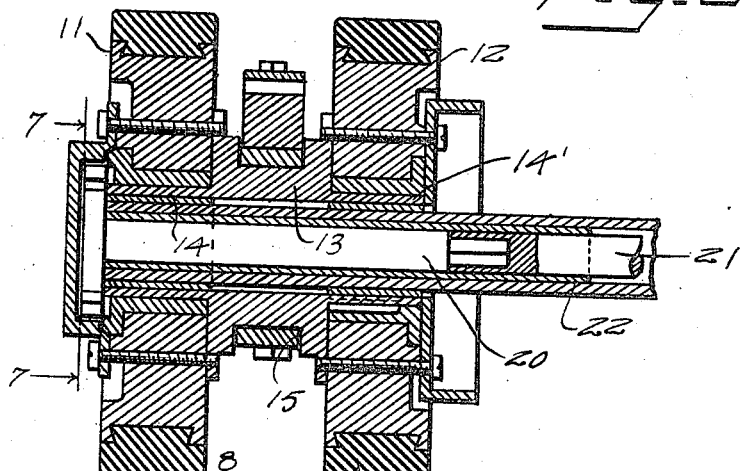
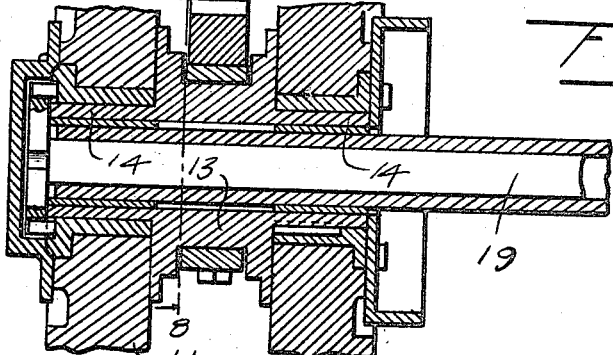
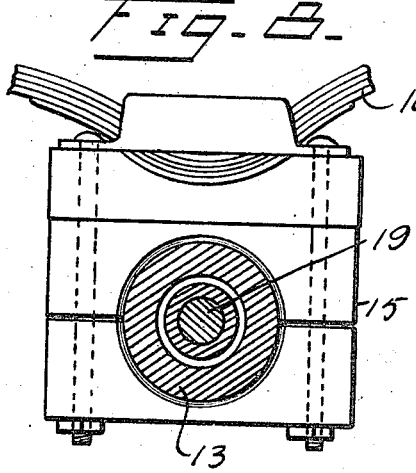
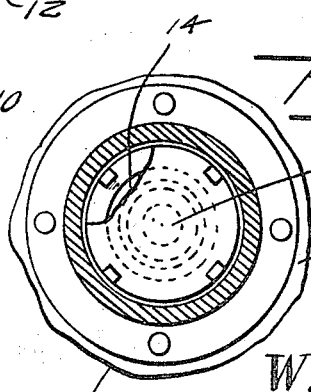
Inventor
W. B. Uffert,
C. W. Powell.
By
Attorney Patented Sept. 30, 1924.

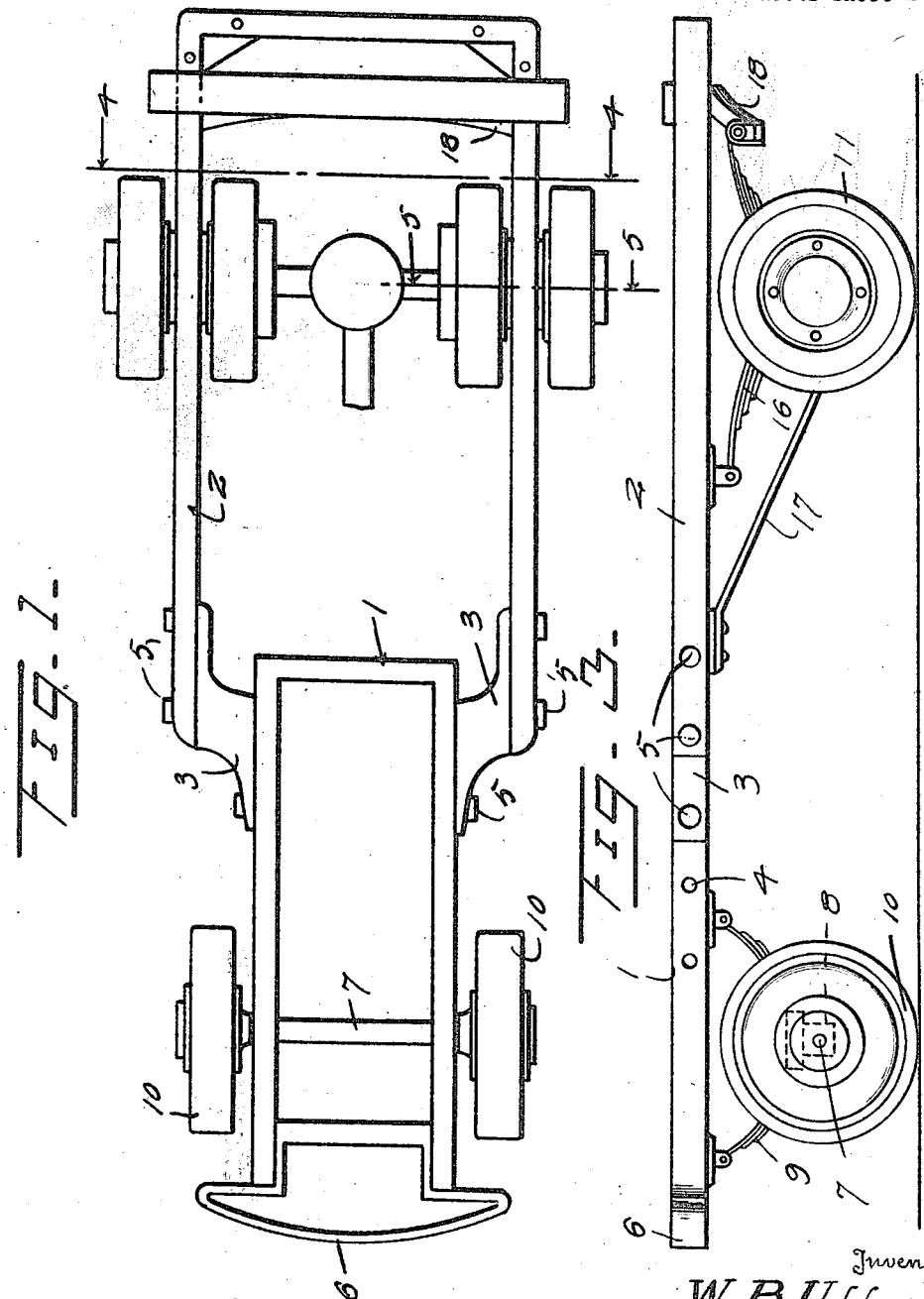

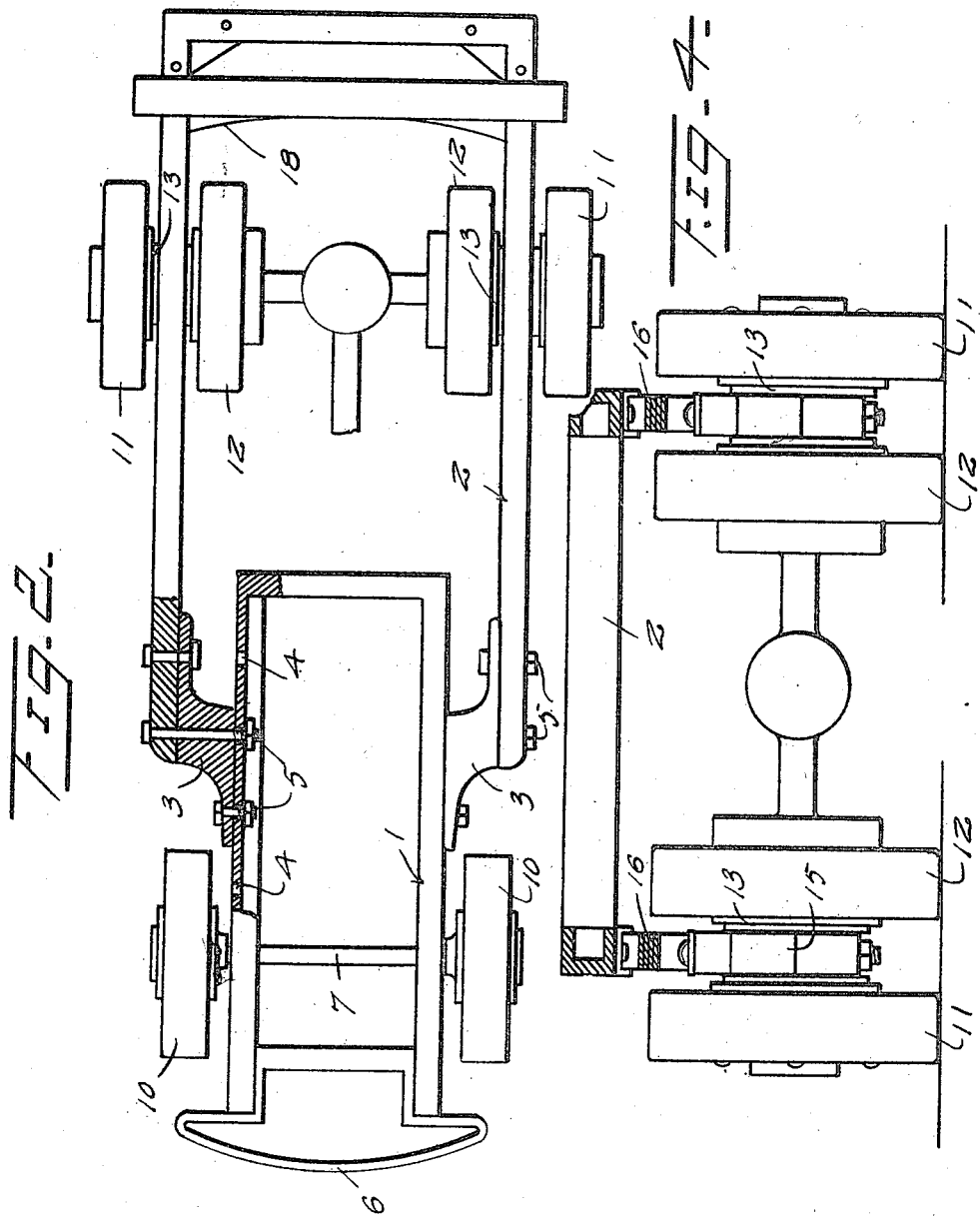

1,510,356

UNITED STATES PATENT OFFICE.

WALTER B. UFFERT AND CHARLES W. POWELL, OF NEW YORK, N. Y.; SAID UFFERT ASSIGNOR OF HIS ENTIRE RIGHT TO SAID POWELL.

VEHICLE RUNNING GEAR.

Application filed December 14, 1921. Serial No. 522,306.

*To all whom it may concern:*

Be it known that we, WALTER B. UFFERT and CHARLES W. POWELL, citizens of the United States, residing at New York city, in the county of New York and State of New York, have invented certain new and useful Improvements in Vehicle Running Gears; and we do hereby declare the following to be a full, clear, and exact description of the invention, such as will enable others skilled in the art to which it appertains to make and use the same.

The invention relates to running gear for motor vehicles, such as trucks, omnibuses and the like designed to carry heavy loads, and aims to improve the main frame which is constructed to admit of linear adjustment and to the mounting of the rear or drive wheels which are provided in pairs, the wheels of each pair being disposed upon opposite sides of a frame bar, load sustaining spring, or like part to equalize the load and relieve the drive axle of all strain except that required for propulsion.

Other objects and advantages will be apparent and suggest themselves as the nature of the invention is understood.

While the drawings illustrate an embodiment of the invention, it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a top plan view of a motor vehicle running gear embodying the invention, the frame being extended, Figure 2 is a view similar to Figure 1, the frame being reduced in length and parts broken away, Figure 3 is a side view of the parts illustrated in Figure 1, and in the same relation, Figure 4 is a section on the line 4—4 of Figure 1, looking in the direction of the arrows, Figure 5 is a detail section on the line 5—5 of Figure 1, showing the parts on a larger scale, Figure 6 is a view similar to Figure 5 of a modification in which the drive axle is continuous, Figure 7 is a sectional detail on the line 7—7 of Figure 5, a portion of the head of the shaft being broken away, and Figure 8 is a detail section of the support for a pair of drive wheels on the line 8—8 of Figure 5, showing the load sustaining mountings thereon in elevation and the drive wheels omitted.

Corresponding and like parts are referred to in the following description and designated in the several views of the drawings by like reference characters.

The main frame of the truck or chassis is of sectional formation and of such construction as to admit of its lengthening and shortening. As shown, the frame comprises a front section 1 and a rear section 2, both sections being approximately of U-form and disposed to have their side members overlapped and adjustably connected whereby the frame may be lengthened or shortened as required.

The front section 1 is of less width than the rear section 2 and is adjustable between brackets 3 secured to the inner sides of the longitudinal members of the section 2. The side members of the section 1 are formed with a plurality of openings whereby to receive the bolts 5 which secure them to the brackets 3 in the required adjusted position. A bumper 6 connects the forward ends of the side members of the section 1. The front axle 7 is carried by the front section 1 and is mounted in bearings 8 attached to side springs 9. The axle 7 is provided with wheels 10 which may be fitted thereto in any preferred way. This arrangement of the sections 1 and 2 admits of the front wheels 10 having a less track than the rear wheels and being disposed about in line with the side bars of the rear section 2.

The rear wheels constitute drivers and are provided in pairs, the wheels of each pair being disposed upon opposite sides of a side bar of the section 2, whereby to equalize the load and relieve the drive axle of undue strain.

The numerals 11 and 12 designate the wheels of a pair which are disposed upon opposite sides of the frame bar or load sustaining member and which are connected for synchronous rotation. A hub or supporting member 13 is provided upon opposite sides with hollow extensions 14 upon which the wheels 11 and 12 are mounted and the middle portion of the member 13 is of circular formation to receive a journal box 15 between which and the circular portion of the member 13 is disposed an antifriction bearing. A side spring 16 is attached centrally to the journal box 15. A brace 17 connects the journal box 15 with a side bar of the frame and maintains the parts in determinate position. The side spring 16 may be of any type and is attached at its forward end to the side bar and at its rear end to a transverse spring 18.

The drive axle 19 may be continuous, as indicated in Figure 6, or of sectional formation, as shown in Figure 5, in which the outer section is designated by the numeral 20 and has an interlocking connection with the inner section 21, a sleeve 22 overlapping the joint. The construction is such as to admit of the ready displacement of the outer wheel 11 when required for any purpose. The wheels 11 and 12 may be bolted or otherwise secured to the member 13 so as to rotate therewith as one part.

It is observed that the front wheels are single, whereas the rear wheels are double or provided in pairs and disposed so as to sustain the load between the wheels of each pair, thereby relieving the rear drive axle of undue strain and precluding any possible tendency of the same to fulcrum.

What is claimed is:

1. A double wheel attachment for the rear axle of a motor vehicle, comprising a rotatable supporting member including a body and opposed extensions, the body of said supporting member being disposed beneath the side bar of the vehicle frame and mounted on the rear axle housing, a wheel mounted on each of the extensions and disposed upon opposite sides of the side bar, a journal box secured to the body of said member and supported thereby, a spring supported by said journal box and supporting the side bars of the frame, a driving attachment between the axle and one of the wheels, and means securing the wheels to the body so as to cause them to rotate in synchronism therewith and with each other.

2. Means for mounting wheels in pairs for synchronous rotation, the same comprising a rotatable supporting member having its ends reduced to form opposed extensions and shoulders where the extensions join the body of the member, a pair of wheels one of which is mounted on each of said extensions and which abut the shoulders, means securing the wheels to said supporting member to cause them to rotate therewith, said supporting member having an annular groove midway between its ends, and a journal box supported by said member and carrying means to secure the same in place.

3. In a motor vehicle employing a differential, a double wheel construction comprising wheels arranged in pairs on each end of the rear axle housing, the wheels of each pair being disposed at opposite sides of the side bar of the vehicle frame, said wheels being connected to a supporting member to rotate in synchronism therewith and with each other, and means connecting one wheel of each pair with the rear axle to be driven thereby.

4. A motor vehicle employing a differential, a double wheel construction comprising wheels arranged in pairs on opposite ends of the rear axle housing, the wheels of each pair being disposed upon opposite sides of the side bar of the vehicle frame, said wheels being detachably connected to a supporting member to rotate in synchronism therewith and with each other, the rear axle of the vehicle being sectional, means connecting the outer wheel of each pair of wheels of the outer section of the axle to be driven thereby, and said detachable connection and sectional axle providing means whereby the outer wheel of each pair may be readily removed without disturbing the inner wheel.

5. A chassis for motor trucks and the like, the same comprising front and rear sections of approximately U-form, said rear section being of greater width and length than said front section, said sections arranged in telescopic relationship with their bight portions toward the rear of the sections and with their side bars extending in parallel planes, the side bars of the front section being provided with a plurality of spaced openings adjacent the bight portion of the front section, brackets secured to the front end portions of the side bars of the rear section, means passing through said brackets and selectively engageable in the openings in the side bars of the front sections to connect the sections together in different adjusted positions, and a bumper secured to the front section and having a bar disposed between the side arms of the front section at their forward ends and bracing and holding the said side arms in position.

In testimony whereof we affix our signatures in presence of two witnesses.

WALTER B. UFFERT.
CHARLES W. POWELL.

Witnesses:
GEORGE M. FITZPATRICK,
JOHN F. MORRISON.